Sept. 4, 1934.  W. E. STEVENS  1,972,498
ROAD SHOULDERING MACHINE
Filed Oct. 26, 1933  3 Sheets-Sheet 2
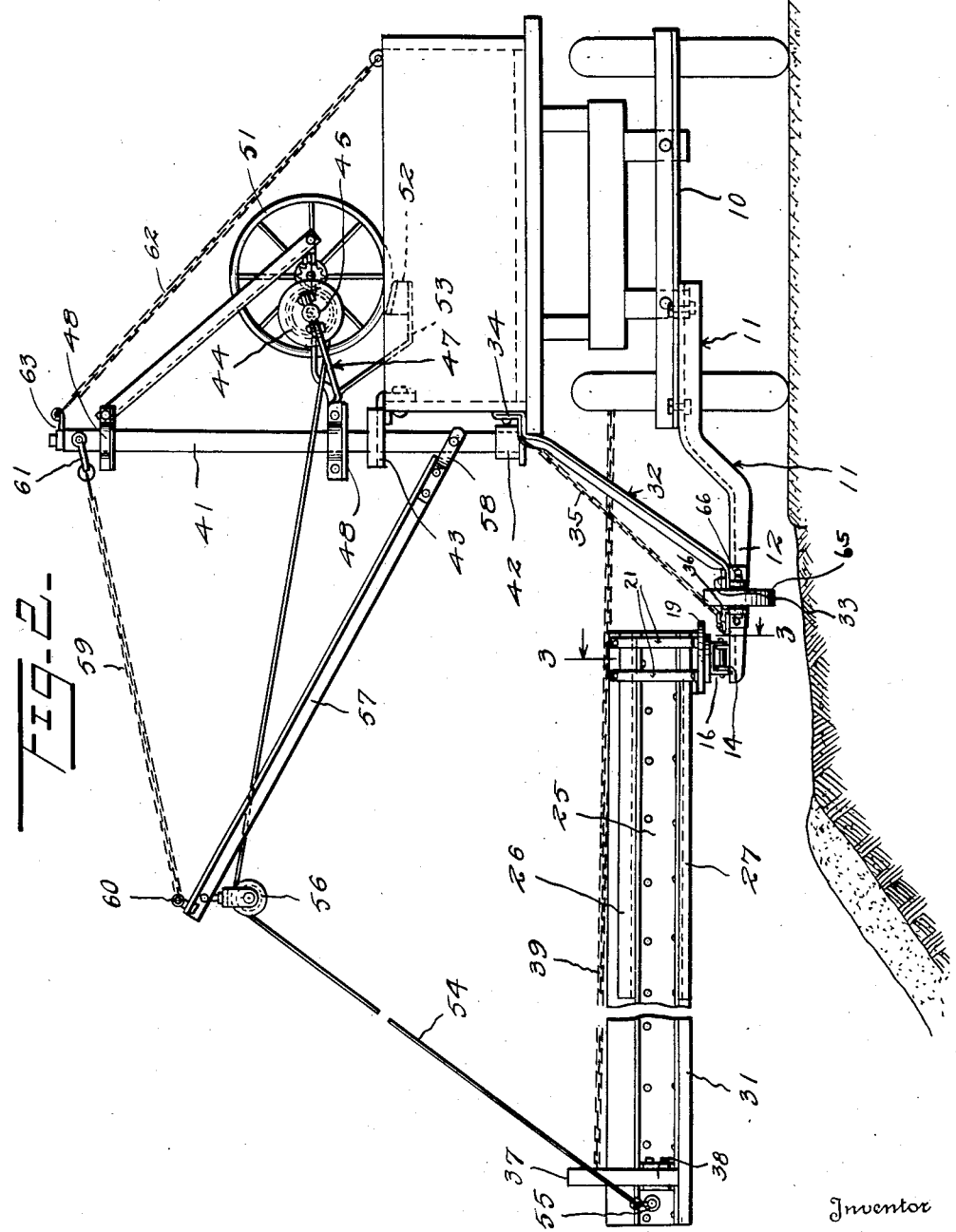
Inventor
W.E. Stevens
By Watson E. Coleman

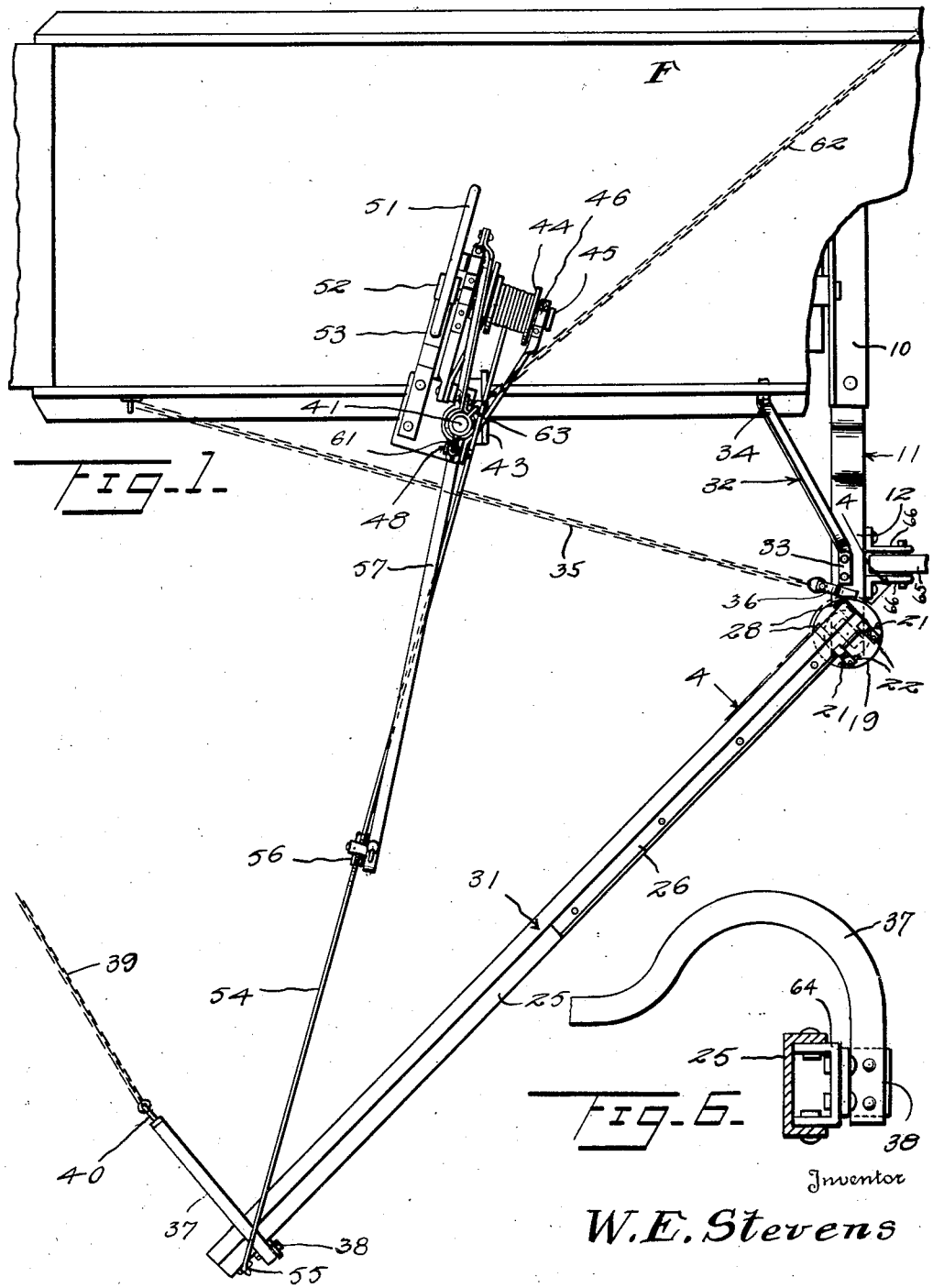

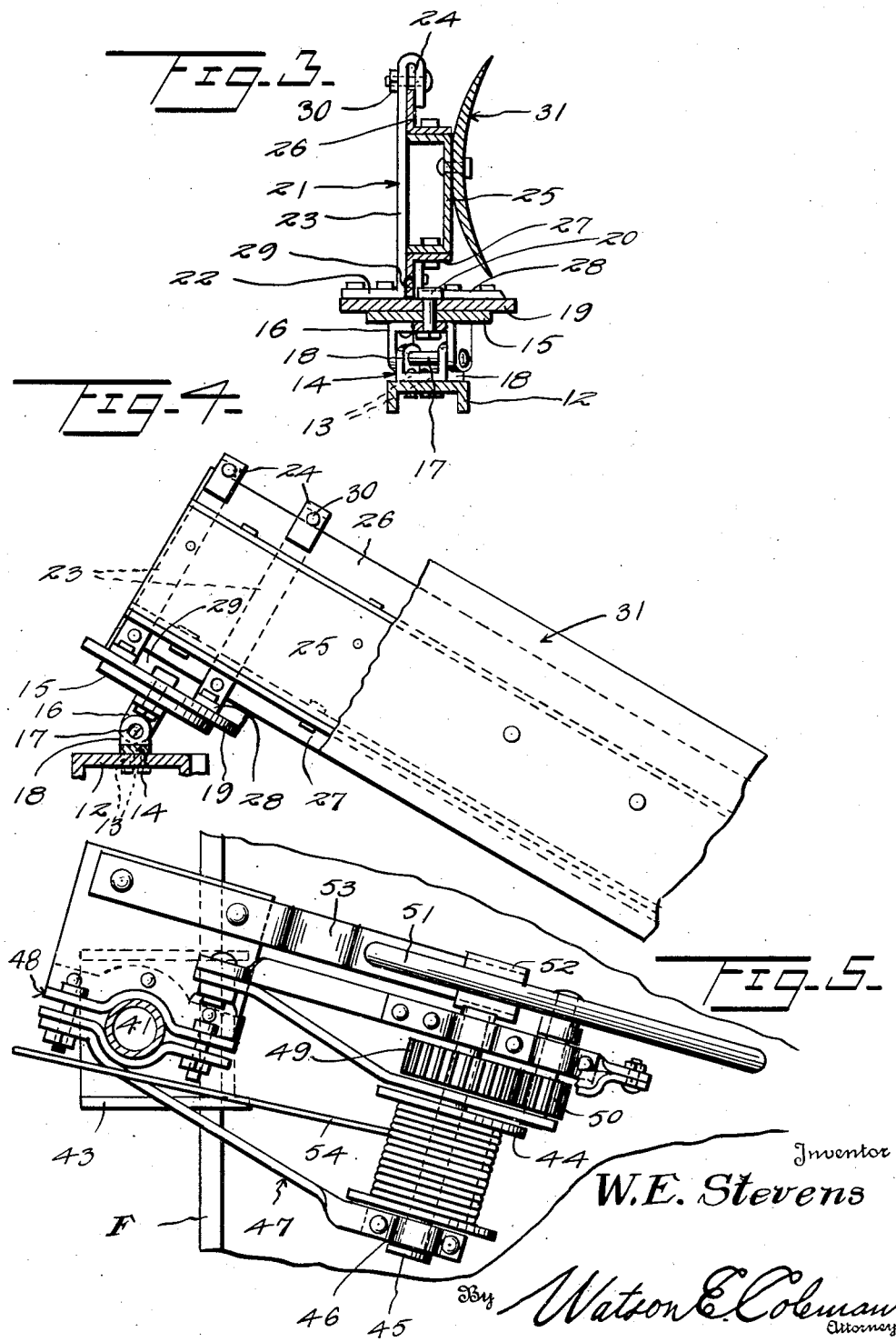

Patented Sept. 4, 1934

1,972,498

UNITED STATES PATENT OFFICE 1,972,498

ROAD SHOULDERING MACHINE

Wesley E. Stevens, Greeley, Colo., assignor of one-fourth to John E. Welsh, one-fourth to Hubert Reece, both of Greeley, Colo., and one-fourth to Ray W. Darling, Loveland, Colo.

Application October 26, 1933, Serial No. 695,343

13 Claims. (Cl. 37—155)

This invention relates to road working machines and more particularly to a machine for grading the shoulders on each side of a road.

An object of the invention is to provide an attachment for a motor vehicle such as a truck or the like, which can be readily mounted on and taken off of the vehicle without disturbing the present parts of the vehicle, the attachment being such as to smoothen the shoulders on the side of the road by being pulled under the action of the vehicle.

Another object of this invention is to provide a relatively simple attachment which can be mounted on a suitable truck or conveyance which can be adjusted to meet the varying conditions along the side of the road for the purpose of smoothening the shoulders and for returning the dirt or material which has washed down from the side of the road into the ditch.

The above and various other objects and advantages of this invention will in part be described and in part be understood from the following detailed description of the present preferred embodiment, the same being illustrated in the accompanying drawings wherein:—

Figure 1 is a top plan view of a device constructed according to the embodiment of this invention, mounted on a motor vehicle truck which is shown in fragmentary form.

Figure 2 is a detail rear elevation of the device partly broken away.

Figure 3 is an enlarged sectional view taken on the line 3—3 of Figure 2.

Figure 4 is a sectional view taken on the line 4—4 of Figure 1.

Figure 5 is a top plan view partly in section of the winch structure.

Figure 6 is a sectional view partly in detail showing the connection between the outer end of the moldboard and the forward end of the vehicle.

Referring to the drawings wherein like characters designate corresponding parts throughout the several views, the letter F designates generally the frame or chassis of a motor vehicle in the form of a truck or the like of suitable size and capacity such as the trucks at present in use for hauling material in the building or repairing of roads or the like.

In order to provide an attachment which can be mounted on the frame F of the vehicle whereby the shoulders on either side of the road can be repaired while the vehicle is positioned on the road and without requiring the vehicle to enter the ditch or run off of the road, I have provided a shouldering means, as will be hereinafter described, which is attached to the frame F and can be readily attached or removed without in any way disturbing the present parts of the vehicle.

An L-shaped drawbar 10 of suitable length is secured to the frame F at a point preferably adjacent the rear end of the frame and disposed therebelow and transversely of the frame. A channeled extension 11 is secured to the drawbar 10 and is formed with a downwardly offset outer end portion 12 disposed in substantially parallel relation with the drawbar 10 but downwardly offset therefrom. This offset portion 12 comprises a supporting means for one end of the grading device hereinafter described.

A substantially U-shaped bearing member 14 is secured adjacent the outer end of the extension 12 as by bolts or rivets 13, or the like, and is mounted in a fixed position with the parallel legs thereof upright. A circular table or plate 15 has secured to the underside thereof a pair of L-shaped brackets 16, and these brackets 16 have a pin or shaft 17 disposed therethrough, the pin 17 being also disposed through the parallel legs 18 of the U-shaped member 14. A second plate or table 19 is disposed on top of the plate 15 and is secured as by a bolt or rivet 20 to the center of the lower plate 15 so that this upper plate 19 may rotate relative to the lower plate 15.

A pair of L-shaped brackets, generally designated as 21, have one leg 22 secured to the top of the rotatable plate or table 19 and the other leg 23 extends upwardly therefrom and terminates in a reverted upper end portion 24. These supporting brackets 21 are spaced apart a desired distance, the purpose for which will be hereinafter described.

An elongated channeled member 25 has secured to one longitudinal edge thereof an L-shaped bar 26 and on the other or lower edge thereof a second L-shaped bar 27. A pair of L-shaped brackets 28 are secured to the upper face of the rotatable plate 19 in a position confronting the two brackets 21 and spaced therefrom by means of a spacing member 29 disposed between the confronting legs of these two members 21 and 28.

The space between the vertical leg of the L-shaped member 28 and the vertical leg 23 of the member 21 constitutes a guide to slidingly receive the depending leg of the L-shaped bar 27 while the upstanding leg of the L-shaped member 26 slidingly engages between the reverted portion 24 of the vertical leg 23 of each member 21. A bolt or securing member 30 extends through the reverted portion 24 of the member 21 and acts to clamp the channeled moldboard supporting member 25 in adjusted position relative to the rotatable table 19. A moldboard 31 is secured to the front side of the channeled member 25 and, in the present instance, this moldboard 31 is of concave construction with a relatively sharp lower edge portion and a relatively sharp outer end portion.

A bracing bar 32 has one end 33 thereof secured to the drawbar extension 12 and the other end 34 secured to the side of the frame or vehicle F at a point forwardly of the drawbar extension 11 so as to brace this member during the pulling of the moldboard 31 along the side of the road. A flexible bracing member 35 is secured as by a clevis 36 to the drawbar extension 11 and has the other end thereof secured to the frame F of the vehicle at a point forwardly of the drawbar 11 and coacts with the rigid bracing member 32 in preventing bending of the drawbar member 11.

A curved beam or drawbar 37 is secured, as by a bracket or angle iron 38, to the channeled member 25 adjacent the outer end of this channeled member and has the opposite end thereof disposed forwardly of the moldboard 31, and a flexible member in the form of a chain, cable or the like 39, is secured as by a clevis 40 to this forward end of the drawbar 37.

The opposite end of the flexible member 39 may be attached to a desired point along the frame F and preferably adjacent the front end thereof. This chain 39 may be adjusted as to length so as to adjust the angle of the moldboard relative to the side of the frame F and thereby permit the moldboard 31 to be disposed in any desired angular position relative to the side of the frame F. In this manner, the outer end of the moldboard can be disposed forwardly of the pivoted inner end portion so that the loose dirt or material in the bottom of a ditch or at the bottom of the shoulder will be drawn upwardly as the vehicle is drawn along the side of the road or, if desired, the outer end of the moldboard 31 can be adjusted with this end inclined rearwardly so as to cause the loose material near the top of the shoulder to be moved downwardly toward the bottom thereof.

It will be apparent, therefore, that the moldboard 31 can be disposed in a selected position relative to the frame F so that it will either move the dirt upwardly from the bottom of the shoulder or move the dirt downwardly. In order to provide a means for holding the moldboard 31 in the desired angle relative to the horizontal so as to smoothen shoulders of various depths and angles while holding the moldboard in adjusted position, I have provided a moldboard supporting and adjusting structure in the form of a supporting post or upright 41, which has the lower end thereof disposed in a socket 42 secured in a fixed position on the frame F. A second socket or bearing member 43 is secured to the frame F at a point upwardly from the lower socket 42, and the post F is rotatable in these two sockets 42 and 43, which sockets hold the post F in upright or vertical position.

A winding drum 44 is secured to a shaft 45 journaled in bearings 46 carried by a winch supporting frame structure, generally designated as 47. This frame structure 47 is secured as by clamping members 48 to the post 41 above the upper socket 43 and the dum 44 is adapted to swing with the rotation of the post 41. A gear 49 is secured to the shaft 45 and a second gear 50 is rotatably carried by the frame structure 47 and meshes with the gear 50 and, in the present instance, is relatively smaller in diameter than the gear 49, and a wheel 51 is rotatable with the gear 50 and constitutes a driving means whereby this gear 50 may be readily turned so as to wind or unwind the drum 44. A braking member 52 carried by a resilient arm 53 secured to the frame 47 frictionally engages the periphery of the wheel 51 so as to hold this wheel 51 against movement under torsional strain applied to the drum 44.

A cable 54 has one end thereof secured to the moldboard supporting beam or member 25 adjacent the outer end thereof, as at 55, and the cable 54 is wound about the drum 44 and is trained through a sheave 56 secured adjacent the outer end of a supporting beam 57. This beam 57 has the inner end thereof secured as by a forked member 58 to the post 41 and is adapted to have rocking movement relative to this post 41. A chain or flexible member 59 has one end thereof secured, as at 60, to the outer end of the T-shaped supporting beam 57 and the other or inner end thereof secured to a clevis 61 carried by the upper end of the post 41.

A flexible bracing member 62 has the upper end thereof secured, as at 63, to the upper end of the post 41, and the other or lower end thereof is adapted to be secured to the side of the frame opposite from the post 41. Through the use of this bracing member 62, the strain applied to the post 41 by the cable 54 is relieved while at the same time, the post 41 may be turned inasmuch as the securing member 63 has an eye or ring loosely engaging the upper end of the post 41.

In the use and operation of this shouldering attachment or machine, the drawbar 10 may be fixedly secured to the desired part of the frame F and preferably, the rear of this frame. The extension 11 can then be removably attached to either end of the drawbar 10 with the supporting shoe or offset portion 12 disposed laterally of the frame F and in a position where it will clear the roadway for the desired distance. The moldboard 31 can be adjusted with the rotatable table 19 by means of the bolt 20 and the angle of this moldboard 31 relative to the longitudinal axis of the frame F can be adjusted by means of the chain or flexible member 39 which is preferably secured at a point adjacent the forward end of the frame F. The angle relative to the horizontal of the moldboard 31 can be adjusted and maintained by means of the winch structure carried by the post 41, and the braking element 54 will hold the wheel 51 of the winch against rotation so as to maintain the moldboard 31 in the desired angular position relative to the horizontal.

It will, of course, be understood that when the moldboard 31 is in operative position, it will be disposed in outstanding relation to the side of the vehicle and the frame F, but when it s desired to maintain the moldboard 31 in inoperative position, it may be lifted and swung inwardly and disposed in substantially parallel relation to the frame F.

As will be noted from Figure 6 of the drawings, the angle iron or bracket 38 has one leg thereof secured to the drawbar 37 and the other leg secured to the bight of a U-shaped member 64 which is secured to the channel iron 25. In order to provide a supporting means for the beam or extension 12, I have provided a wheel 65 which is mounted on a pair of rearwardly extending L-shaped brackets 66. This wheel 65 extends below the bottom of the beam or supporting member 12 and normally this wheel 65 will contact with the ground and relieve the springs or frame F of any pressure which may be applied in a downward direction by the moldboard 31.

It will be apparent from the foregoing that the shoulder forming means herein disclosed may be readily attached or detached from a vehicle of conventional construction without altering any of the present parts of the vehicle.

What is claimed is:—

1. A road shouldering means adapted to be mounted on a vehicle comprising a moldboard, a supporting means for the moldboard secured to the vehicle and extending laterally therefrom, clamping means carried by said supporting means engaging one end of the moldboard to secure said one end of the moldboard to the supporting means in a manner to permit lengthening or shortening of the moldboard, and means engaging the other end of the moldboard for holding the moldboard in adjusted angular relation relative to the vehicle.

2. A road shouldering means adapted to be mounted on a vehicle comprising a moldboard, a supporting arm adapted to be secured to the vehicle and extend laterally therefrom, clamping means carried by the arm and engaging one end of the moldboard to secure said one end of the moldboard to the arm in a manner to permit lengthening or shortening of the moldboard, means engaging the other end of the moldboard and the vehicle to hold the moldboard in angular relation relative to the movement of the vehicle, and means for supporting the moldboard in adjusted position relative to the horizontal.

3. A road shouldering means adapted to be mounted on a vehicle comprising a moldboard, a supporting member for the moldboard secured to the vehicle and extending laterally therefrom, a plate rockably carried by said supporting member, means engaging the plate member and the inner end of the moldboard to secure said inner end of the moldboard to the plate, means engaging the outer end of the moldboard and the vehicle to hold the moldboard in adjusted position relative to the line of travel of the vehicle, and a winch structure adapted to be mounted on the vehicle and engaging the moldboard outwardly of the inner end thereof to hold the moldboard in adjusted position relative to the horizontal.

4. A road shouldering means adapted to be mounted on a vehicle comprising a moldboard, a supporting member for the moldboard secured in a fixed position to the vehicle and extending laterally therefrom, a plate pivotally secured to the supporting member, clamping means carried by the plate and engaging the inner end of the moldboard to secure said inner end of the moldboard in adjusted position to said plate, means for holding the moldboard in adjusted position relative to the line of travel of the moldboard, and means for holding the moldboard in adjusted position relative to the horizontal.

5. A road shouldering means adapted to be mounted on a vehicle comprising a moldboard, a drawbar secured to the vehicle and extending laterally therefrom, an extension carried by the drawbar and extending in downwardly offset and parallel relation thereto, a plate rockably carried by said extension, means carried by said plate and engaging the inner end of the moldboard to mount said inner end of the moldboard for substantially universal swinging movement on said extension, means engaging the outer end of the moldboard and the vehicle to hold the moldboard in adjusted angular relation relative to the line of travel of the vehicle, and means adapted to be mounted on the vehicle and engaging the moldboard to hold the moldboard in adjusted position relative to the horizontal.

6. A road shouldering means adapted to be mounted on a vehicle comprising a moldboard, a drawbar adapted to be secured to the vehicle, an extension carried by the drawbar extending laterally of the vehicle and in downwardly offset relation to the drawbar, a moldboard supporting table, means for rockably securing the table to said extension, means engaging the inner end of the moldboard and the table to swingably secure the inner end of the moldboard on the table, means engaging the outer end of the moldboard to hold the moldboard in adjusted angular relation relative to the line of travel of the vehicle, and means for holding the moldboard in adjusted relation relative to the horizontal.

7. A road shouldering attachment for a vehicle comprising a drawbar adapted to be mounted on the vehicle of a moldboard, a plate rockably carried by said drawbar means for securing the moldboard to the plate, means for holding the moldboard in adjusted angular relation relative to the line of travel of the vehicle, a winch structure adapted to be mounted on the vehicle, a cable carried by said winch structure and engaging the moldboard to hold the moldboard in adjusted position relative to the horizontal.

8. A road shouldering attachment for a vehicle comprising a moldboard, a drawbar adapted to be secured to the vehicle, an extension carried by the drawbar and disposed in downwardly and laterally offset relation relative thereto, a moldboard supporting table, means for rockably securing said table to said extension, a rotatable table, means for rotatably securing said second table to said first table, and means carried by said second table and engaging the inner end of the moldboard to secure said moldboard to said second table.

9. A road shouldering attachment for a vehicle comprising a moldboard, a drawbar adapted to be secured to the vehicle, means for securing said moldboard to the drawbar in a manner whereby said moldboard may have substantially universal swinging movement relative thereto, means for holding the moldboard in adjusted position relative to the horizontal and to the line of travel of the vehicle, said securing means comprising a table, means for rockably securing said table to said drawbar, a plate, means for rotatably mounting said plate on said table, and means carried by said plate and engaging the inner end of the moldboard to hold said moldboard in adjusted position relative to said plate.

10. A road shouldering attachment adapted to be mounted on a vehicle comprising a moldboard, a drawbar adapted to be secured to the vehicle, means for securing said moldboard to said drawbar, means engaging the outer end of the moldboard for holding the moldboard in adjusted position relative to the line of travel of the vehicle, means adapted to be mounted on the vehicle for holding the moldboard in adjusted position relative to the horizontal, said securing means comprising a table, means for rockably securing the table to the drawbar, a plate, means for rotatably mounting the plate on the table, a clamping means mounted on the plate, and a slide member secured to the moldboard and engaging said clamping means for holding the moldboard in adjusted position relative to said plate.

11. A road shouldering attachment for a vehicle comprising a moldboard, a drawbar adapted to be secured to the vehicle, means for securing the inner end of the moldboard to the drawbar, means for holding the moldboard in adjusted position relative to the line of travel of the vehicle and means for holding the moldboard in adjusted position relative to the horizontal, said securing means comprising a table, means for rockably mounting the table or drawbar, a plate, means for rotatably securing the plate to the table, a plurality of L-shaped members secured to said plate, a clamping means carried by certain of said L-shaped members, and a slide member secured to said moldboard and engaging between said L-shaped members.

12. A road shouldering attachment for a vehicle comprising a moldboard, a drawbar adapted to be secured to the vehicle, means for securing the inner end of the moldboard to the drawbar whereby the moldboard may have substantially universal movement relative to the drawbar, means engaging the outer end of the moldboard to hold the moldboard in adjusted position relative to the line of travel of the vehicle, means for holding the moldboard in adjusted position relative to the horizontal, said securing means comprising a table, means for rockably securing said table to said drawbar, a plate rotatably mounted on the table, a pair of L-shaped members mounted on the plate, a second pair of L-shaped members mounted on the plate with one leg thereof disposed in spaced relation to an adjacent leg of said first pair of L-shaped members, a clamping means carried by said first L-shaped members, and means secured to the moldboard and engaging said clamping means and engaging between the opposing legs of said L-shaped members to hold the moldboard in adjusted position relative to said plate.

13. A road shouldering attachment for a vehicle comprising a moldboard, a drawbar adapted to be secured to the vehicle, means for securing the inner end of the moldboard to the drawbar whereby said moldboard may have substantially universal swinging movement relative to the drawbar, means engaging the outer end of the moldboard to hold the moldboard in adjusted position relative to the line of travel of the vehicle and means adapted to be mounted on the vehicle and engaging the moldboard to hold the moldboard in adjusted position relative to the horizontal, said securing means comprising a table, means for rockably mounting the table on the drawbar, a plate rotatably secured to said table, a pair of L-shaped members mounted on the table in spaced relation to each other, a second pair of L-shaped members mounted on the plate in spaced relation to each other with one leg thereof confronting the leg of said first L-shaped members, a channeled member secured to said moldboard, oppositely extending means secured to said channeled member and engaging between said pairs of L-shaped members, and means engaging said channeled member for holding said latter member in adjusted position relative to said plate.

WESLEY E. STEVENS.